United States Patent
Iochi et al.

(10) Patent No.: US 7,620,417 B2
(45) Date of Patent: Nov. 17, 2009

(54) COMMUNICATION TERMINAL APPARATUS, SCHEDULING METHOD, AND TRANSMISSION POWER DERIVING METHOD

(75) Inventors: Hitoshi Iochi, Kanagawa (JP); Hidetoshi Suzuki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 535 days.

(21) Appl. No.: 11/629,905

(22) PCT Filed: Jun. 14, 2005

(86) PCT No.: PCT/JP2005/010833

§ 371 (c)(1), (2), (4) Date: Dec. 18, 2006

(87) PCT Pub. No.: WO2005/125049

PCT Pub. Date: Dec. 29, 2005

(65) Prior Publication Data

US 2008/0076462 A1    Mar. 27, 2008

(30) Foreign Application Priority Data

Jun. 18, 2004    (JP) ............................. 2004-181792

(51) Int. Cl.
    *H04Q 7/20* (2006.01)
(52) U.S. Cl. .......................... 455/522; 455/69; 455/68; 455/127.1; 455/500; 455/426.1; 370/329; 370/337; 370/343; 370/468; 370/345
(58) Field of Classification Search ................ 455/522, 455/69, 68, 127.1, 500, 517, 426.1, 426.2, 455/422.1, 403, 550.1, 560, 561; 370/329, 370/337, 343, 345, 310, 468
    See application file for complete search history.

(56) References Cited

U.S. PATENT DOCUMENTS 7,146,142 B1    12/2006 Raaf (Continued)

FOREIGN PATENT DOCUMENTS

JP    200226811    1/2002

(Continued)

OTHER PUBLICATIONS

PCT International Search Report dated Sep. 13, 2005.

(Continued)

*Primary Examiner*—Keith T Ferguson
(74) *Attorney, Agent, or Firm*—Dickinson Wright PLLC

(57) ABSTRACT

A communication terminal apparatus that can perform an appropriate system operation at the network side and also can avoid a reduction in throughput and a reduction in system efficiency. In this apparatus, a compressed mode calculating part (124) determines, based on compressed information and slot format information, a slot that is a gap in a frame of a compressed mode. A transmission power control part (125) establishes a transmission power obtained by increasing, by &Dgr;Pilot, the transmission power as designated and set by a TPC command for the slots other than the gap in the frame of the compressed mode. A DPCCH transmission power reporting part (127) outputs, to a channel encoding part (128), a report value indicative of the transmission power obtained by removing the effect of &Dgr;Pilot from the transmission power established by the transmission power control part (125).

8 Claims, 11 Drawing Sheets

U.S. PATENT DOCUMENTS

2003/0118057 A1    6/2003  Ushirokawa et al.
2004/0114555 A1*   6/2004  Hayashi et al. ............. 370/329
2008/0159184 A1*   7/2008  Niwano ..................... 370/278

FOREIGN PATENT DOCUMENTS

| WO | 0042717  | 7/2000  |
|----|----------|---------|
| WO | 0101599  | 1/2001  |
| WO | 0147146  | 6/2001  |
| WO | 03096560 | 11/2003 |

OTHER PUBLICATIONS

"Boosting of DPCCH pilot power for E-DCH," 3GPP TSG-RAN WG1 #37, R1-040497, Montreal, Canada, May 10-14, 2004, Samsung, pp. 1-8.

* cited by examiner

| SLOT FORMAT NO. | CHANNEL BIT RATE (KBPS) | CHANNEL SYMBOL RATE (KSPS) | CHIPS PER SLOT | BITS PER FRAME | CHIPS PER SLOT | BITS OF PILOT SIGNAL | BITS OF TPC COMMAND | BITS OF TFCI | BITS OF FBI | SLOTS TO BE TRANSMITTED IN A FRAME |
|---|---|---|---|---|---|---|---|---|---|---|
| 0 | 15 | 15 | 2560 | 150 | 10 | 6 | 2 | 2 | 0 | 15 |
| 0A | 15 | 15 | 2560 | 150 | 10 | 5 | 2 | 3 | 0 | 10-14 |
| 0B | 15 | 15 | 2560 | 150 | 10 | 4 | 2 | 4 | 0 | 8-9 |
| 1 | 15 | 15 | 2560 | 150 | 10 | 8 | 2 | 0 | 0 | 8-15 |
| 2 | 15 | 15 | 2560 | 150 | 10 | 5 | 2 | 2 | 1 | 15 |
| 2A | 15 | 15 | 2560 | 150 | 10 | 4 | 2 | 3 | 1 | 10-14 |
| 2B | 15 | 15 | 2560 | 150 | 10 | 3 | 2 | 4 | 1 | 8-9 |
| 3 | 15 | 15 | 2560 | 150 | 10 | 7 | 2 | 0 | 1 | 8-15 |
| 4 | 15 | 15 | 2560 | 150 | 10 | 6 | 1 | 0 | 2 | 8-15 |
| 5 | 15 | 15 | 2560 | 150 | 10 | 5 | 1 | 2 | 2 | 15 |
| 5A | 15 | 15 | 2560 | 150 | 10 | 4 | 1 | 3 | 2 | 10-14 |
| 5B | 15 | 15 | 2560 | 150 | 10 | 3 | 1 | 4 | 2 | 8-9 |

COMMUNICATION TERMINAL APPARATUS, SCHEDULING METHOD, AND TRANSMISSION POWER DERIVING METHOD

TECHNICAL FIELD

The present invention relates to a communication terminal apparatus, scheduling method and transmission power deriving method, and more particular, to a communication terminal apparatus, scheduling method and transmission power deriving method that report transmission power of a channel including a known symbol to a network side such as a base station.

BACKGROUND ART

Techniques for transmitting packet data at a high rate in uplink are under consideration. In such packet data transmission techniques, it is necessary to allocate which communication terminal apparatus performs transmission. This allocation, namely, scheduling is determined at a base station based on information about the transmission power of a channel transmitted by a communication terminal or how much transmission power can be used for transmitting packet data, the amount of transmission data to be transmitted by the communication terminal apparatus, and the like. Scheduling information determined at the base station is transmitted to each communication terminal apparatus in communication, and the communication terminal apparatus transmits packet data to the base station based on the received scheduling result information. In DPCHs (Dedicated Physical Channels) which are used in a WCDMA system and dedicated channels for carrying out transmission power control, there are a DPDCH (Dedicated Physical Data Channel) which is actual transmission data such as a packet and a DPCCH (Dedicated Physical Control Channel) which is made up of a pilot signal and the like. In high-rate uplink packet transmission, in order to enable the base station to perform scheduling, the communication terminal apparatus measures the transmission power of the DPCCH having the pilot signal for performing closed loop transmission power control and reports information of the measured DPCCH transmission power to the base station. By receiving the transmission power information from the communication terminal apparatus, the base station can know whether the communication terminal apparatus is located at an edge of a cell and in a state of not having a margin for transmission power, or is located near the base station and performs transmission at a high rate.

FIG. 1 shows a DPCCH frame format which is defined in 3GPP TS25.211. In the DPCCH, one frame has a length of 10 msec. and is made up of 15 slots of slots #0 to #14. Each slot is made up of pilot symbol #51, TFCI (Transport Format Combination Indicator) #52, FBI (Feedback Indicator) #53 and TPC (Transmit Power Control) #54.

When a FDD (Frequency Division Duplex) scheme is used like WCDMA that is a worldwide standard for mobile communication, each base station can use a plurality of carriers within allocated frequency band. In this case, it is necessary for a communication terminal apparatus to seek for the plurality of carriers used by the same base station. For example, if the communication terminal apparatus has only one oscillator, when the communication terminal apparatus seeks for a carrier of 2,050 MHz in downlink, a carrier frequency difference between uplink and downlink is 190 MHz in the FDD, and therefore transmission at 1,950 MHz in uplink is impossible. In such a case, the communication terminal apparatus uses a compressed mode having a temporary transmission stop period called a gap in uplink in order to transmit data that cannot be transmitted. In a frame of the compressed mode, the transmission power is temporarily increased to prevent quality deterioration by a gain decrease due to transmission stop during the gap. For ease of explanation, FIG. 2 shows a drawing assuming a case where power does not change due to closed loop transmission power control. When transmission data is made up of normal frames #60 and #62 which are not in the compressed mode and frame #61 in the compressed mode having gap #63, the transmission power of each slot of frame #61 in the compressed mode is set higher by ΔP64 than the transmission power of each slot of the normal frames which are not in the compressed mode.

A technique to achieve a high rate and low delay in uplink, which is called uplink enhancement, is under consideration (for example, Non-patent Document 1). In the uplink enhancement, it is proposed that, in order to increase channel estimation accuracy in a case of transmitting high-rate data, pilot transmission power should be increased temporarily. That is, as shown in FIG. 3, in the case of performing transmission at a high transmission rate in a DPCCH including pilot symbol #71, TFCI #72, FBI #73 and TPC #74, the transmission power of pilot symbol #71 is set higher by ΔP75 than the case of performing transmission at a normal transmission rate.

Non-patent Document 1: 3GPP, R1-040497, Boosting of DPCCH pilot power for E-DCH, Samsung

DISCLOSURE OF INVENTION

Problems to be Solved by the Invention

However, in the conventional apparatus, DPCCH transmission power control using gap #63, ΔP64 and ΔP75 is not particularly considered, and therefore, even if the propagation path environment is the same for the communication terminal apparatus applying the compressed mode or high-rate transmission using uplink enhancement and a communication terminal apparatus not applying the compressed mode and the high-rate transmission, the different transmission power is reported from the communication terminal apparatus applying the compressed mode and the high-rate transmission and the communication terminal apparatus not applying the compressed mode and the high-rate transmission, to a network-side apparatus such as a base station. Therefore, it becomes impossible for the network-side apparatus such as the base station to compare the DPCCH transmission power of all communication terminal apparatuses based on the same measure, so that there is a problem that it is not possible to perform appropriate system operation on the network side.

For example, in the communication terminal apparatus in which the DPCCH transmission power is controlled by the compressed mode or uplink enhancement, as a result of setting transmission power of each slot higher than normal, the transmission power within a predetermined period of time reported to the base station may be larger than the transmission power set based on the TPC command. In this case, the communication terminal apparatus performs transmission with transmission power of nearly a maximum value, and therefore the network side judges that the allocation of a high transmission rate is no use, and issues an instruction to decrease the transmission rate allocated to the communication terminal apparatus. As a result, although there is a margin for transmission power, the communication terminal apparatus is not allowed to perform transmission at a high rate in a frame other than a compressed-mode frame or a frame at a transmission rate other than the above-described predetermined high-rate transmission, and therefore, there is a problem of decrease in throughput.

On the other hand, in a communication terminal apparatus in which the transmission power is controlled by the compressed mode, since transmission is stopped in a slot provided with a gap, the transmission power within a predetermined period of time reported to the base station may be smaller than the case of not applying the compressed mode. In this case, the network side judges that the communication terminal apparatus has a margin for transmission power and allows to perform transmission at a high rate. As a result, the communication terminal apparatus cannot increase its transmission power, and therefore, cannot perform transmission at a high transmission rate, and cannot use all the resource allocated by the network side. Therefore, there is a problem of decrease in system efficiency such as decrease in throughput and decrease in capacity.

Further, transmission parameters such as a signaling report cycle in uplink and repetition for transmitting high-rate packet data in downlink cannot be set to appropriate values, and therefore, there is a problem that downlink throughput is affected as well.

It is an object of the present invention to provide a communication terminal apparatus, scheduling method, and transmission power deriving method that enable a network side to carry out appropriate system operation and that can prevent a decrease in throughput and a decrease in system efficiency by reporting transmission power according to communication environment.

Means for Solving the Problem

A communication terminal apparatus of the present invention is configured having: a transmission power setting section that sets transmission power of a predetermined channel including a known symbol based on a TPC command for controlling transmission power and information for transmission power setting included in a received signal; a transmission power reporting section that reports transmission power of the channel set based on the TPC command out of the transmission power set at the transmission power setting section; and a transmitting section that transmits a transmission signal based on the transmission power set at the transmission power setting section.

A scheduling method of the present invention has the steps of: setting transmission power of a predetermined channel including a known symbol based on a TPC command and information for transmission power setting included in a received signal; reporting transmission power of the channel set based on the TPC command out of set transmission power from a communication terminal apparatus to a base station; transmitting a transmission signal with set transmission power from the communication terminal apparatus to the base station; obtaining communication quality of each communication terminal apparatus at the base station from the transmission power reported from the communication terminal apparatus to the base station and reception power of the predetermined channel including the known symbol received at the base station; and carrying out scheduling for allocating transmission based on the communication quality of each communication terminal apparatus.

A transmission power deriving method of the present invention has the steps of: setting transmission power of a predetermined channel including a known symbol based on a TPC command for controlling transmission power and information for transmission power setting included in a received signal; and obtaining transmission power of the channel set based on the TPC command out of set transmission power.

ADVANTAGEOUS EFFECT OF THE INVENTION

According to the present invention, by reporting transmission power with high accuracy in uplink, it is possible to perform appropriate system operation on the network side and prevent a decrease in throughput and a decrease in system efficiency.

BRIEF DESCRIPTION OF DRAWINGS

FIG. 8 lists slot formats according to Embodiment 1 of the present invention;

BEST MODE FOR CARRYING OUT THE INVENTION

Now, embodiments of the present invention will be described in detail with reference to the drawings.

Embodiment 1

Figure 1:
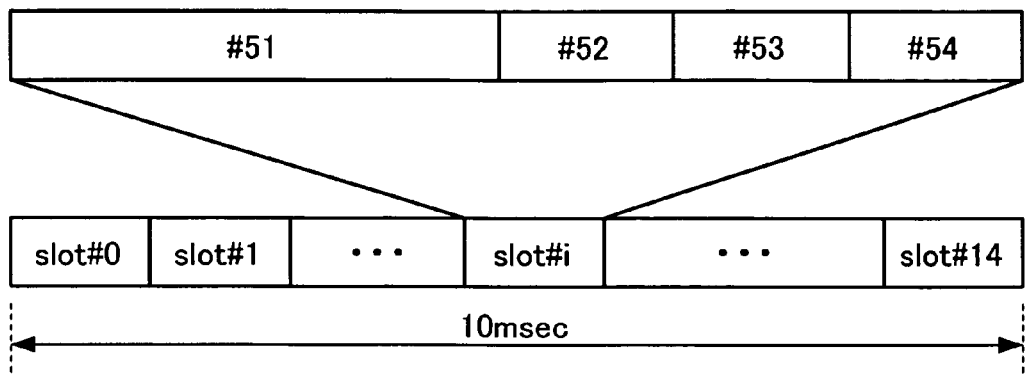
FIG. 1 illustrates a DPCCH format.
Figure 2:
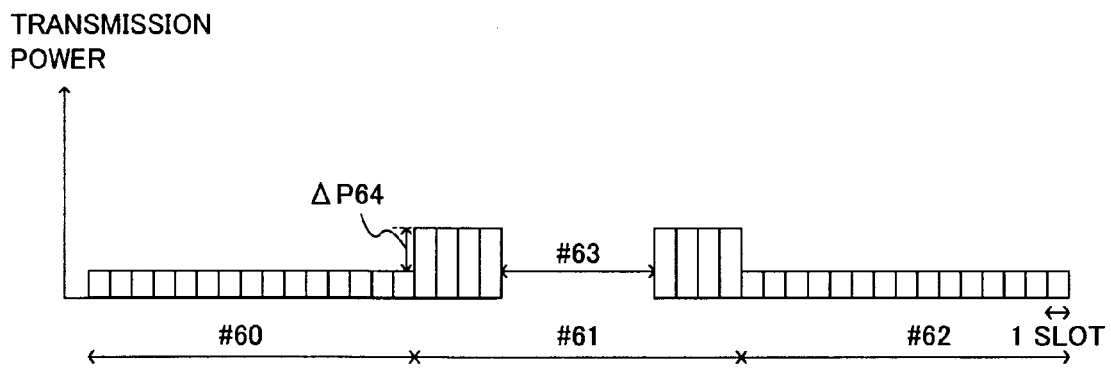
FIG. 2 illustrates transmission power of each slot.
Figure 3:
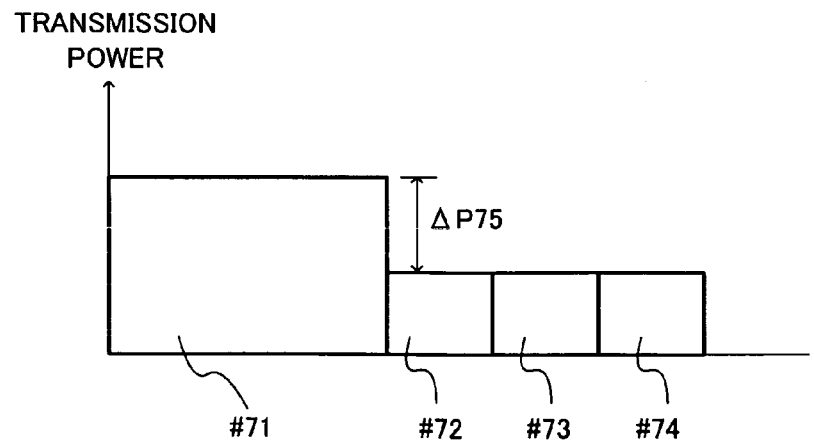
FIG. 3 illustrates transmission power of each data.
Figure 4:
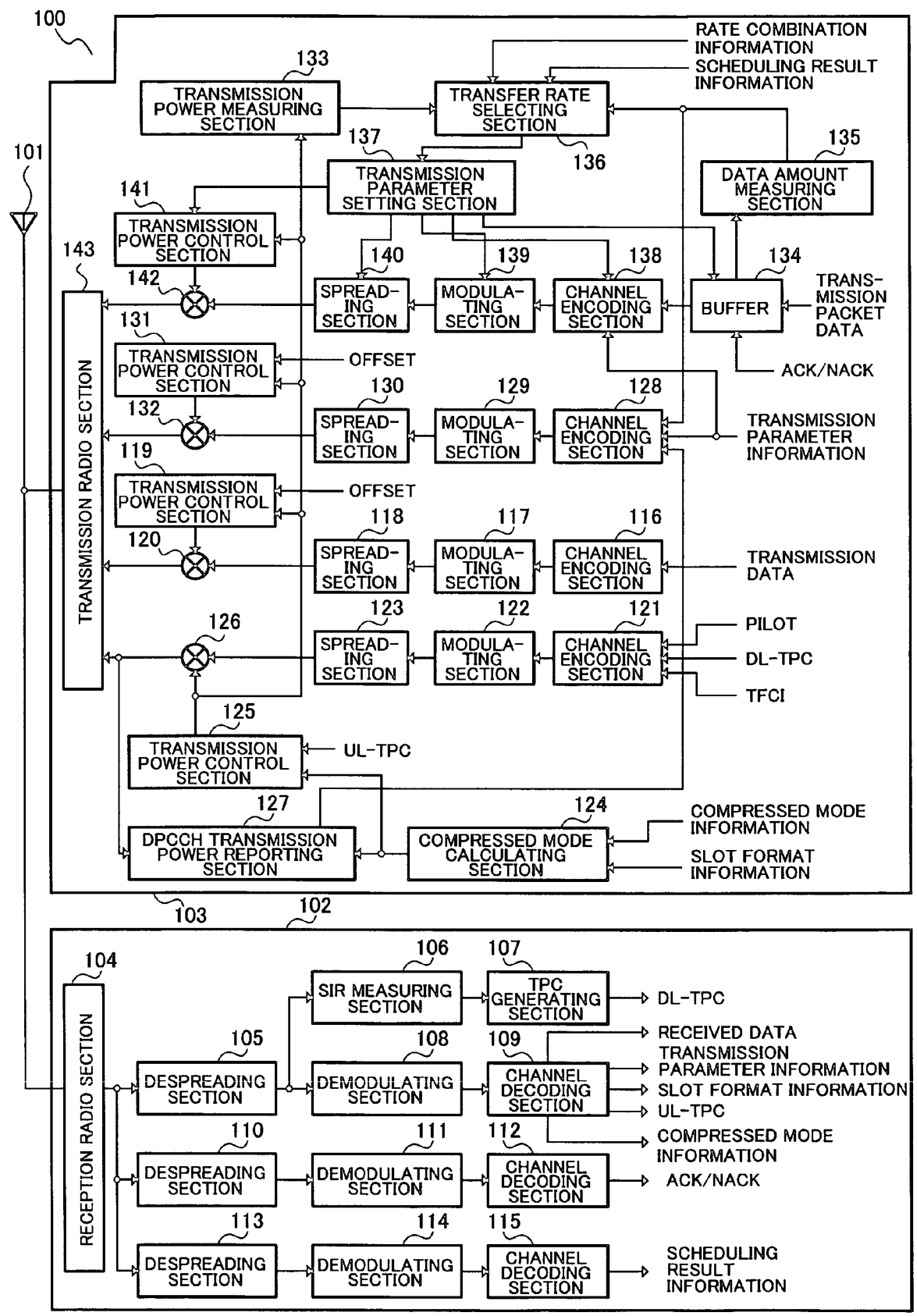
FIG. 4 is a block diagram showing a configuration of a communication terminal apparatus according to Embodiment 1 of the present invention.

FIG. 4 is a block diagram showing a configuration of communication terminal apparatus 100 according to Embodiment 1 of the present invention. Communication terminal apparatus 100 is mainly configured with antenna 101, reception apparatus 102 and transmission apparatus 103.

First, the configuration of reception apparatus 102 will be described. Reception apparatus 102 is configured with reception radio section 104, despreading section 105, SIR (Signal to Interference Ratio) measuring section 106, TPC generating section 107, demodulating section 108, channel decoding section 109, despreading section 110, demodulating section 111, channel decoding section 112, despreading section 113, demodulating section 114 and channel decoding section 115.

Reception radio section 104 down-converts a received signal received at antenna 101 from a radio frequency to a baseband frequency and outputs the result to despreading section 105, despreading section 110 and despreading section 113.

Despreading section 105 performs despreading processing on the received signal inputted from reception radio section 104 and outputs the result to SIR measuring section 106 and demodulating section 108.

SIR measuring section 106 measures an SIR using a pilot signal included in the received signal inputted from despreading section 105 and outputs information of the measured SIR value to TPC generating section 107.

TPC generating section 107 generates a TPC command (DL-TPC) for controlling transmission power in downlink from the information of the measured SIR value inputted from SIR measuring section 106.

Demodulating section 108 demodulates the received signal inputted from despreading section 105 and outputs demodulated received data to channel decoding section 109.

Channel decoding section 109 extracts a TPC command (UL-TPC) for controlling transmission power in uplink included in the received data inputted from demodulating section 108. Also, channel decoding section 109 extracts compressed mode information (information for transmission power setting) including gap timing information and slot format information (information for transmission power setting) that is information of a slot format of the DPCCH included in the received data. Further, channel decoding section 109 extracts transmission parameter information that is information for setting a signaling report cycle and transmission parameters of the number of bits to be increased in repetition which is processing of increasing the number of bits of data at communication terminal apparatus 100. Further, channel decoding section 109 outputs the received data after extracting the TPC command, compressed mode information, slot format information and transmission parameter information.

Despreading section 110 despreads the received signal inputted from reception radio section 104 and outputs the result to demodulating section 111.

Demodulating section 111 demodulates the received signal inputted from despreading section 110 and outputs demodulated received data to channel decoding section 112.

Channel decoding section 112 decodes the received data inputted from demodulating section 111 and extracts an ACK signal indicating successful reception at the base station or a NACK signal indicating unsuccessful reception at the base station.

Despreading section 113 despreads the received signal inputted from reception radio section 104 and outputs the result to demodulating section 114.

Demodulating section 114 demodulates the received signal inputted from despreading section 113 and outputs demodulated received data to channel decoding section 115.

Channel decoding section 115 decodes the received data inputted from demodulating section 114 and extracts scheduling result information that is information of a scheduling result.

Next, the configuration of transmission apparatus 103 will be described. Transmission apparatus 103 is configured with channel encoding section 116, modulating section 117, spreading section 118, transmission power control section 119, multiplier 120, channel encoding section 121, modulating section 122, spreading section 123, compressed mode calculating section 124, transmission power control section 125, multiplier 126, DPCCH transmission power reporting section 127, channel encoding section 128, modulating section 129, spreading section 130, transmission power control section 131, multiplier 132, transmission power measuring section 133, buffer 134, data amount measuring section 135, transfer rate selecting section 136, transmission parameter setting section 137, channel encoding section 138, modulating section 139, spreading section 140, transmission power control section 141, multiplier 142 and transmission radio section 143.

Channel encoding section 121, modulating section 122, spreading section 123, compressed mode calculating section 124, transmission power control section 125, multiplier 126 and DPCCH transmission power reporting section 127 carry out processing to transmit data on a DPCCH. Channel encoding section 116, modulating section 117, spreading section 118, transmission power control section 119 and multiplier 120 carry out processing to transmit data on a DPDCH. Channel encoding section 128, modulating section 129, spreading section 130, transmission power control section 131 and multiplier 132 carry out processing to transmit data on a control channel for packet data in uplink. Transmission power measuring section 133, buffer 134, data amount measuring section 135, transfer rate selecting section 136, transmission parameter setting section 137, channel encoding section 138, modulating section 139, spreading section 140, transmission power control section 141 and multiplier 142 carry out processing to transmit data on a channel for packet data in uplink.

Channel encoding section 116 encodes inputted transmission data on the DPDCH and outputs encoded transmission data to modulating section 117. For ease of explanation, the DPDCH is assumed as a fixed-rate channel.

Modulating section 117 modulates the transmission data inputted from channel encoding section 116 and outputs the modulated transmission signal to spreading section 118.

Spreading section 118 spreads the transmission signal inputted from modulating section 117 and outputs the result to multiplier 120.

Transmission power control section 119 multiplies transmission power inputted from transmission power control section 125 by a fixed offset and outputs the result to multiplier 120.

Multiplier 120 multiplies the transmission signal inputted from spreading section 118 by transmission power inputted from transmission power control section 119 and outputs the result to transmission radio section 143.

Channel encoding section 121 encodes transmission data of the DPCCH including a pilot signal which is a known symbol, a TPC command generated by TPC generating section 107 and TFCI command which is DPDCH format information and outputs encoded transmission data X to modulating section 122.

Modulating section 122 modulates the transmission data inputted from channel encoding section 121 and outputs the modulated transmission signal to spreading section 123.

Spreading section 123 spreads the transmission signal inputted from modulating section 122 and outputs the result to multiplier 126.

Compressed mode calculating section 124 specifies gap slots in a frame of the compressed mode based on the compressed mode information and slot format information extracted from the received data at channel decoding section 109, calculates the gap slots and ΔPilot, and outputs information of the calculated gap slots and ΔPilot to transmission power control section 125 and DPCCH transmission power reporting section 127.

Transmission power control section 125 which is a transmission power setting section calculates and sets transmission power (first transmission power) of the DPCCH based on the TPC command extracted at channel decoding section 109.

At this time, transmission power control section 125 sets transmission stop to the gap slots according to the information of the gap slots inputted from compressed mode calculating section 124. For slots (high-power slots) other than the gap slots in the frame in which the compressed mode is applied, transmission power control section 125 sets transmission power (second transmission power) increased according to ΔPilot from the transmission power that is set as indicated by the TPC command, according to the ΔPilot information inputted from compressed mode calculating section 124. Then, transmission power control section 125 outputs the set transmission power to transmission power control section 119, multiplier 126, transmission power control section 131, transmission power measuring section 133 and transmission power control section 141.

Multiplier 126 multiplies the transmission signal of the DPCCH inputted from spreading section 123, by the transmission power set at transmission power control section 125, and outputs the result to DPCCH transmission power reporting section 127 and transmission radio section 143.

For the frames other than the compressed mode frame, DPCCH transmission power reporting section 127 which is a transmission power reporting section obtains a reported value of transmission power within a predetermined reporting segment based on the transmission power inputted from multiplier 126, and outputs the reported value as transmission power information to channel encoding section 128. For the slots other than gap in the compressed mode frame, DPCCH transmission power reporting section 127 subtracts transmission power according to ΔPilot from the transmission power inputted from multiplier 126 in order to cancel the effect of ΔPilot, according to the information of the gap slots and ΔPilot information inputted from compressed mode calculating section 124. For the gap slots in the compressed mode frame, DPCCH transmission power reporting section 127 does not include the transmission power inputted from multiplier 126 in the reported value of transmission power. That is, DPCCH transmission power reporting section 127 cancels the effect of ΔPilot from the transmission power of the slots other than the gap, obtains a reported value of transmission power within the predetermined reporting segment based on transmission power in which the transmission power of the gap slots is removed, and outputs the reported value as transmission power information to channel encoding section 128.

Channel encoding section 128 encodes transmission data including the transmission power information inputted from DPCCH transmission power reporting section 127 and the data amount information inputted from data amount measuring section 135 as information that is used by the base station for scheduling and outputs the encoded transmission data to modulating section 129. Channel encoding section 128 outputs the transmission data to modulating section 129 in the signaling report cycle indicated by the transmission parameter information extracted at channel decoding section 109. For ease of explanation, the output of channel encoding section 128 is assumed as a fixed-rate output.

Modulating section 129 modulates the transmission data inputted from channel encoding section 128 and outputs the modulated transmission signal to spreading section 130.

Spreading section 130 performs spreading processing on the transmission signal inputted from modulating section 129 and outputs the result to multiplier 132.

Transmission power control section 131 multiplies the transmission power inputted from transmission power control section 125 by a fixed offset and outputs the result to multiplier 132.

Multiplier 132 multiplies the transmission signal inputted from spreading section 130 by the transmission power inputted from transmission power control section 131 and outputs the result to transmission radio section 143.

Transmission power measuring section 133 which stores maximum transmission power as a resource subtracts the transmission power inputted from transmission power control section 125 from the stored maximum transmission power and outputs information of the remaining resource, that is, information of the remaining transmission power to transfer rate selecting section 136.

Buffer 134 temporarily stores inputted transmission packet data and outputs transmission packet data of the number of bits indicated by indicative information which is information of the number of bits inputted from transmission parameter setting section 137, to channel encoding section 138. At this time, if an ACK signal extracted at channel decoding section 112 is inputted, buffer 134 outputs new transmission packet data to channel encoding section 138, and, if a NACK signal extracted at channel decoding section 112 is inputted, outputs transmission packet data that has previously been outputted as retransmission data to channel encoding section 138. Also, buffer 134 outputs information of the data amount outputted to channel encoding section 138 to data amount measuring section 135.

Data amount measuring section 135 measures the data amount, according to the information of the data amount inputted from buffer 134 during a predetermined period of time, and outputs information of the measured data amount to channel encoding section 128 and transfer rate selecting section 136.

Transfer rate selecting section 136 selects an optimum transmission rate out of candidates for the transmission rate based on the transmission power information inputted from transmission power measuring section 133, scheduling result information extracted at channel decoding section 115, data amount information inputted from data amount measuring section 135, and rate combination information which is information of the candidates for the transmission rate stored in advance in a storage section which is not shown. Then, transfer rate selecting section 136 outputs information of the selected transmission rate to transmission parameter setting section 137.

Transmission parameter setting section 137 selects transmission parameters such as the number of bits to be transmitted, coding rate, M-ary number, the offset amount of transmission power and spreading factor based on the transmission rate information inputted from transfer rate selection section 136. Then, transmission parameter setting section 137 outputs indicative information that issues an instruction to output the selected number of bits to buffer 134. Also, transmission parameter setting section 137 outputs indicative information for performing encoding at the selected coding rate to channel encoding section 138. Transmission parameter setting section 137 also outputs indicative information for performing modulation at the selected M-ary number to modulating section 139. Transmission parameter setting section 137 also outputs indicative information for performing spreading processing at the selected spreading factor to spreading section 140. Further, transmission parameter setting section 137 outputs indicative information of the offset amount indicating a ratio of an increase or decrease in transmission power with respect to the DPCCH transmission power to transmission power control section 141.

Channel encoding section 138 encodes the transmission packet data inputted from buffer 134 based on the indicative information inputted from transmission parameter setting section 137 and the transmission parameter information extracted at channel decoding section 109 and outputs the encoded data to modulating section 139. In particular, channel encoding section 138 encodes the transmission packet data inputted from buffer 134 at the coding rate indicated by the indicative information inputted from transmission parameter setting section 137, carries out repetition processing indicated by the transmission parameter information, and outputs the result to modulating section 139.

Modulating section 139 modulates the transmission packet data inputted from channel encoding section 138 based on the indicative information inputted from transmission parameter setting section 137 and outputs the modulated data to spreading section 140.

Spreading section 140 performs spreading processing on the transmission packet data inputted from modulating section 139 based on the indicative information inputted from transmission parameter setting section 137 and outputs the result to multiplier 142.

Transmission power control section 141 multiplies the transmission power inputted from transmission power control section 125 by the offset amount based on the indicative information inputted from transmission parameter setting section 137 and outputs the result to multiplier 142.

Multiplier 142 multiplies the transmission packet data inputted from spreading section 140 by the transmission power inputted from transmission power control section 141 and outputs the result to transmission radio section 143.

Transmission radio section 143 up-coverts the transmission signal inputted from multiplier 120, the transmission signal inputted from multiplier 126, the transmission signal inputted from multiplier 132 and the transmission signal inputted from multiplier 142 from the baseband frequency to the radio frequency and outputs the results from antenna 101.

Figure 5:
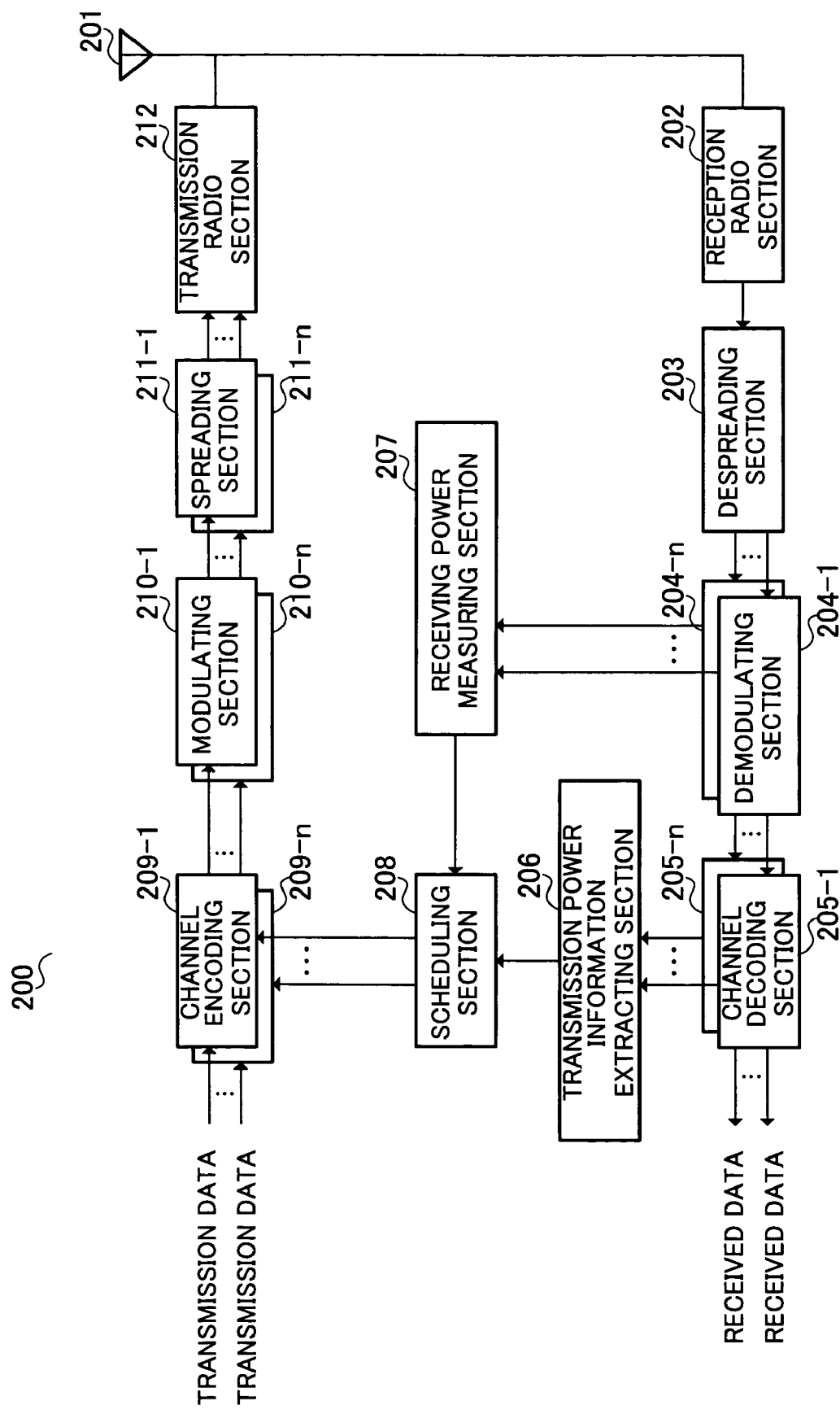
FIG. 5 is a block diagram showing a configuration of a base station according to Embodiment 1 of the present invention.

Next, the configuration of base station 200 will be described using FIG. 5. FIG. 5 is a block diagram showing the configuration of base station 200. Base station 200 receives signals transmitted on a plurality of channels from a plurality of communication terminal apparatuses 100 and performs reception processing for each channel. The description and explanation of FIG. 5 of the configuration other than the configuration for reception processing of signals including DPCCH transmission power information reported by the communication terminal will be omitted.

Reception radio section 202 down-converts received signals received at antenna 201 from the radio frequency to the baseband frequency and outputs the results to despreading section 203.

Despreading section 203 performs despreading processing on the received signals inputted from reception radio section 202 and outputs the received signals from each communication terminal apparatus to demodulating sections 204-1 to 204-n (n is an arbitrary natural number).

Demodulating sections 204-1 to 204-n demodulate the received signals inputted from despreading section 203 and outputs the demodulated received data to channel decoding sections 205-1 to 205-n and reception power measuring section 207.

Channel decoding sections 205-1 to 205-n decode the received data inputted from demodulating sections 204-1 to 204-n and outputs the decoded received data to transmission power information extracting section 206.

Transmission power information extracting section 206 extracts DPCCH transmission power information and data amount information included in the received data inputted from channel decoding sections 205-1 to 205-n and outputs the results to scheduling section 208.

Reception power measuring section 207 measures the reception power for each communication terminal apparatus based on the received signals of the DPCCH for each communication terminal apparatus inputted from demodulating sections 204-1 to 204-n. Then, reception power measuring section 207 outputs information of the measured reception power or information of SIR obtained from the reception power to scheduling section 208.

Scheduling section 208 carries out scheduling for allocating transmission to the communication terminal apparatuses based on the DPCCH transmission power information and data amount information inputted from transmission power information extracting section 206, and the DPCCH reception power or SIR information inputted from reception power measuring section 207, and generates scheduling result information. Scheduling section 208 also generates transmission parameter information. Then, scheduling section 208 outputs the scheduling result information and transmission parameter information to channel encoding sections 209-1 to 209-n corresponding to each communication apparatus.

Channel encoding sections 209-1 to 209-n encode transmission data including the scheduling result information inputted from scheduling section 208 and output the encoded data to modulating sections 210-1 to 210-n.

Modulating sections 210-1 to 210-n modulate the transmission data inputted from channel encoding sections 209-1 to 209-n and output the modulated transmission signals to spreading sections 211-1 to 211-n.

Spreading sections 211-1 to 211-n perform spreading processing on the transmission signals inputted from modulating sections 210-1 to 210-n and output the results to transmission radio section 212.

Transmission radio section 212 up-converts the transmission signals inputted from spreading sections 211-1 to 211-n from the baseband frequency to the radio frequency and transmits the results from antenna 201.

Figure 6:
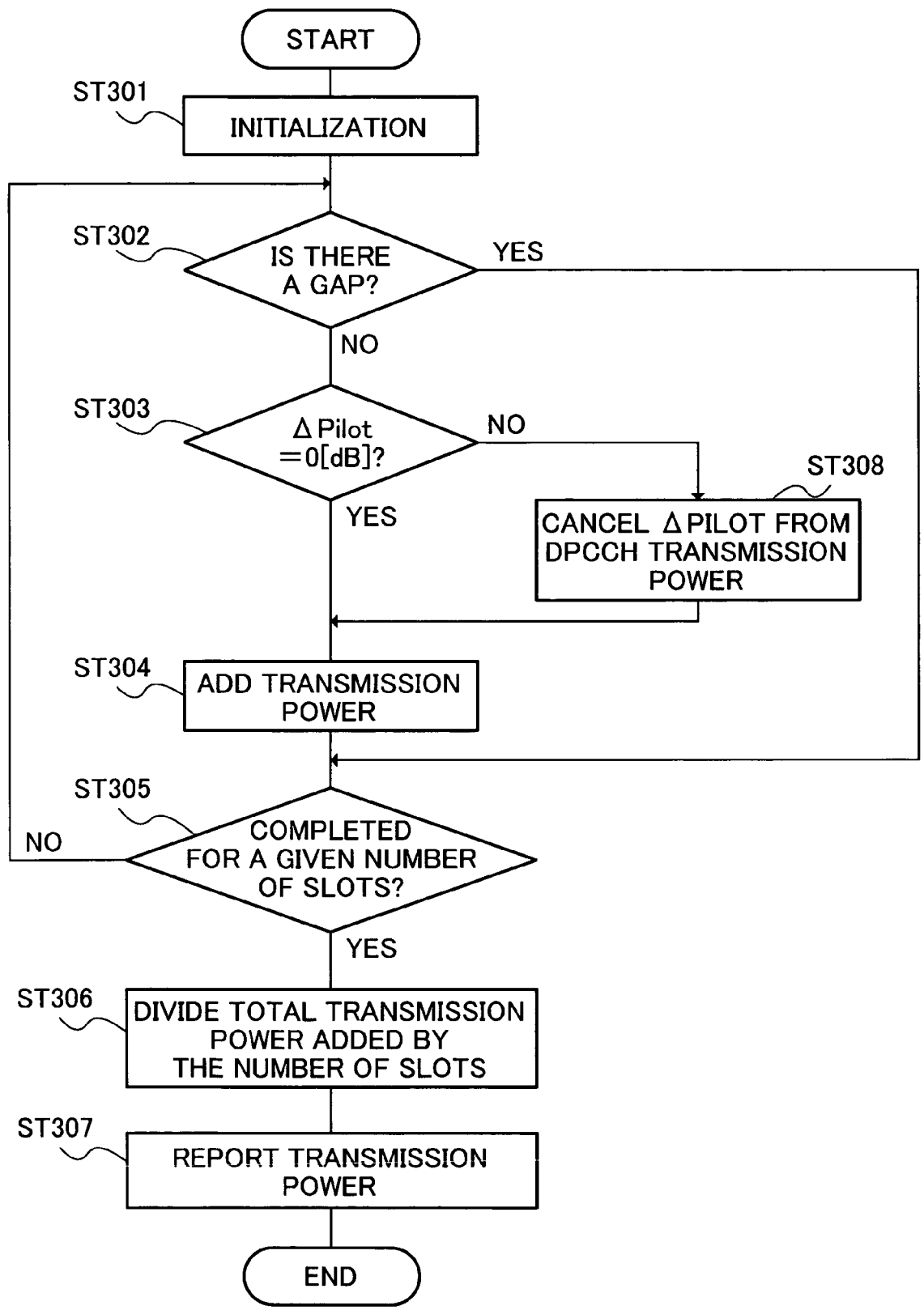
FIG. 6 is a flowchart illustrating a scheduling method according to Embodiment 1 of the present invention.

Next, a method for scheduling in uplink will be described using FIG. 6. FIG. 6 is a flowchart illustrating a scheduling method. First, a case will be described where communication terminal apparatus 100 receives a signal in the frame which is not in the compressed mode.

Communication terminal apparatus 100 initializes DPCCH transmission power reporting section 127 (step ST301).

Then, channel decoding section 109 of communication terminal apparatus 100 acquires a received TPC command in uplink.

Figure 7:
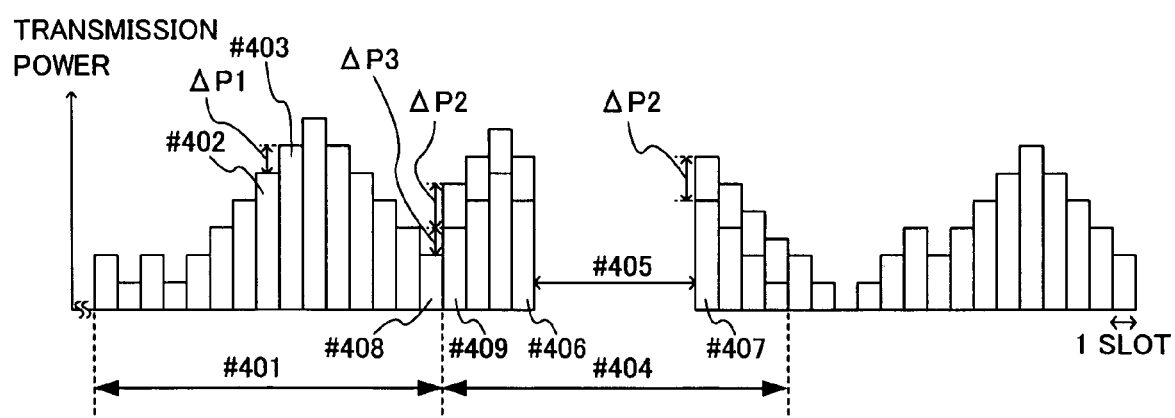
FIG. 7 illustrates transmission power of each slot according to Embodiment 1 of the present invention.

Then, transmission power control section 125 of communication terminal apparatus 100 sets transmission power of the DPCCH based on the TPC command. At this time, there is no input from compressed mode calculating section 124, and therefore transmission power control section 125 outputs the transmission power set based on the TPC command to multiplier 126. In particular, as shown in FIG. 7, in non-compressed mode frame #401, transmission power control section 125 adds transmission power to the transmission-power of preceding received DPCCH slot in decibel (dB) units according to the TPC command. For example, if the preceding received slot is slot #402, and the TPC command issues an instruction to increase the transmission power by $\Delta P1$, transmission power control section 125 sets the transmission power added by $\Delta P1$ to the transmission power set in slot #402 as the transmission power of slot #403 to be transmitted next.

Then, DPCCH transmission power reporting section 127 of communication terminal apparatus 100 determines whether or not the received slot is a gap (step ST302). At this time, there is no input from compressed mode calculating section 124, and therefore DPCCH transmission power reporting section 127 determines that the slot is not a gap.

Then, DPCCH transmission power reporting section 127 determines whether or not ΔPilot is 0 dB, that is, whether or not it is necessary to increase transmission power by ΔPilot using the compressed mode (step S303). At this time, frame #401 is not a compressed-mode frame, and there is no input of compressed mode information to increase transmission power by ΔPilot from compressed mode calculating section 124, and therefore DPCCH transmission power reporting section 127 determines that transmission power should not be increased by ΔPilot. Thus, DPCCH transmission power reporting section 127 adds the transmission power set in accordance with the TPC command to the transmission power of past slots set after the initialization (step ST304).

Then, DPCCH transmission power reporting section 127 determines whether or not processing has been completed for all slots of frame #401 (step ST305).

If processing has been completed for all slots of frame #401, DPCCH transmission power reporting section 127 divides the additional value of the transmission power of the slots added after the initialization by the number of the slots and obtains transmission power per slot (step ST306). For example, frame #401 is made up of 15 slots, and therefore transmission power per slot is determined by dividing the additional value of the transmission power set for the 15 slots by 15.

Then, communication terminal apparatus 100 reports the transmission power per slot determined by DPCCH transmission power reporting section 127 to base station 200 as DPCCH transmission power information (step ST307).

On the other hand, in step ST305, if processing has not been completed for all slots of one frame, the processings of steps ST302 to ST305 are repeated.

When base station 200 receives the DPCCH transmission power information, transmission power information extracting section 206 extracts the transmission power information, and reception power measuring section 207 measures reception power. Then, scheduling section 208 of base station 200 carries out scheduling based on the reception power information and transmission power information. In particular, scheduling section 208 can estimate communication quality for each communication terminal apparatus by obtaining the DPCCH reception power at base station 200 of each communication terminal apparatus 100 with respect to the DPCCH transmission power at each communication terminal apparatus 100. Therefore, scheduling section 208 allocates transmission to a predetermined number of communication terminal apparatuses 100 in descending order of estimated communication quality of communication terminal apparatuses 100. Then, base station 200 transmits the scheduling result to each communication terminal apparatus 100 as scheduling result information. Further, scheduling section 208 sets transmission parameters, and base station 200 transmits the set transmission parameter information to communication terminal apparatus 100. Besides, base station 200 transmits to communication terminal apparatus 100 information that sets frame #404 next to frame #401 to be the compressed mode and compressed-mode information including information as to which slots are set as transmission stop. Also, slot format information is transmitted to each communication terminal apparatus 100 upon a start of communication.

Next, when communication terminal apparatus 100 receives the scheduling result information, channel decoding section 115 acquires the scheduling result information, and transfer rate selecting section 136 selects a transmission rate based on the scheduling result information. When selecting a transmission rate, for example, transfer rate selecting section 136 stores a table storing information for transmission rate selection in which transmission power information, scheduling result information, data amount information, and rate combination information are associated with transmission rate information, and selects a transmission rate by referring to the information for transmission rate selection using the transmission power information, scheduling result information, data amount information and rate combination information. Communication terminal apparatus 100 that receives transmission parameter information transmits DPCCH transmission power information and data amount information to base station 200 in the signaling report cycle indicated by the transmission parameter information.

Based on the selected transmission rate, then, transmission parameter setting section 137 of communication terminal apparatus 100 selects transmission parameters such as the number of bits to be transmitted, coding rate, M-ary number, the offset amount of transmission power and spreading factor. When selecting the transmission parameters, for example, transmission parameter setting section 137 stores a table storing information for transmission parameter setting in which the transmission parameters are associated with transmission rates, and selects the transmission parameters by referring to the stored information for transmission parameter setting using information of the transmission rate selected by transfer rate selecting section 136.

Then, communication terminal apparatus 100 processes transmission packet data using the transmission parameters selected by transmission parameter setting section 137, and transmits the result to base station 200. At this time, channel encoding section 138 carries out repetition processing indicated by the transmission parameter information.

Next, a case will be described where communication terminal apparatus 100 receives a signal in the compressed mode frame.

Communication terminal apparatus 100 initializes DPCCH transmission power reporting section 127, after setting of transmission power has been completed for all slots of frame #401 (step ST301).

Then, channel decoding section 109 of communication terminal apparatus 100 acquires a received uplink TPC command.

Then, communication terminal apparatus 100 extracts received compressed mode and slot format information from the data received by channel decoding section 109. The slot format information is information as shown in FIG. 8. In FIG. 8, frames of slot format numbers "0", "1", "2", "3", "4" and "5" are the formats of slots in a non-compressed mode frame, and frames of slot format numbers "0A", "0B", "2A", "2B", "5A" and "5B" are the formats of slots in a compressed mode frame, corresponding to slot format numbers "0", "2" and "5". The slot format that is used in the compressed mode frame is calculated and determined at communication terminal apparatus 100 based on the gap length.

Then, compressed mode calculating section 124 of communication terminal apparatus 100 determines gap slots in the compressed mode frame based on the compressed mode information. For example, the compressed mode information received by communication terminal apparatus 100 includes information indicating that frame #404 is a compressed mode frame, information indicating that gap #405 of the compressed mode starts at the next slot of slot #406, and information indicating the number of slots of gap #405. Compressed mode calculating section 124 finds that gap #405 starts at a slot next to slot #404, its length is 7 slots, and slot #407 is transmitted following gap #405 by calculation. Also, compressed mode calculating section 124 finds that this frame is a slot format number "0B" by calculation from information of the number of slots of gap #405 and the slot format information (for example, slot format number "0") set upon a start of communication. Further, compressed mode calculating section 124 finds by calculation that the transmission power of each slot in compressed mode frame #404 is increased by ΔP2 as ΔPilot from the transmission power set by the TPC command.

Then, transmission power control section 125 of communication terminal apparatus 100 sets DPCCH transmission power based on the TPC command, ΔPilot information and information of the gap specified at compressed mode calculating section 124. In particular, transmission power control section 125 adds transmission power to the transmission power of the preceding received DPCCH slot in decibel (dB) units according to the TPC command, and adds ΔPilot to the transmission power set by the TPC command according to the ΔPilot information. For example, if the preceding received slot is slot #408, and the TPC command issues an instruction to increase the transmission power by ΔP3, transmission power control section 125 sets the transmission power added by ΔP3 to the transmission power set for slot #408 as transmission power of slot #409 to be transmitted next to slot #408. Besides, transmission power control section 125 further increases the transmission power by ΔP2 according to the ΔPilot information. That is, transmission power control section 125 sets the transmission power increased by ΔP2+ΔP3 from the transmission power of slot #408 as the transmission power of slot #409.

Then, DPCCH transmission power reporting section 127 of communication terminal apparatus 100 determines whether or not the received slot is a gap (step ST302).

If it is not a gap, DPCCH transmission power reporting section 127 determines whether or not ΔPilot is 0 dB (step ST303).

The information for increasing the transmission power by ΔP2 is inputted from compressed mode calculating section 124 to DPCCH transmission power reporting section 127, and therefore, ΔPilot is not 0 dB. Therefore, DPCCH transmission power reporting section 127 cancels ΔPilot, namely, ΔP2 from the DPCCH transmission power set at transmission power control section 125 (step ST308). Then, DPCCH transmission power reporting section 127 adds the transmission power obtained after canceling ΔP2 from the DPCCH transmission power set at transmission power control section 125, that is, the transmission power set in accordance with the TPC command to the transmission power of past slots set after the initialization (step ST304). The additional value of the obtained transmission power of the slots in frame #404 is the addition of only the transmission power of the slots to be transmitted and does not include the transmission power of the slots of gap #405, so that it is possible to measure DPCCH transmission power that does not include transmission power control other than closed loop transmission power control.

On the other hand, in step ST302, if the received slot is a gap, DPCCH transmission power reporting section 127 does not add the transmission power to the transmission power of past slots set after the initialization, and determines whether or not processing has been completed for all slots of frame #404 (step ST305).

If processing has been completed for all slots of frame #404, DPCCH transmission power reporting section 127 divides the additional value of the transmission power of the slots added after the initialization by the number of the slots except the slots of gap #405 in frame #404 and determines transmission power per slot (step ST306). For example, the number of slots in frame #404 except gap #405 is 8, and therefore transmission power per slot is determined by dividing the additional value of the transmission power set for the eight slots by 8. Subsequent processing is the same as processing for a non-compressed mode frame, and therefore description thereof will be omitted.

Figure 9:
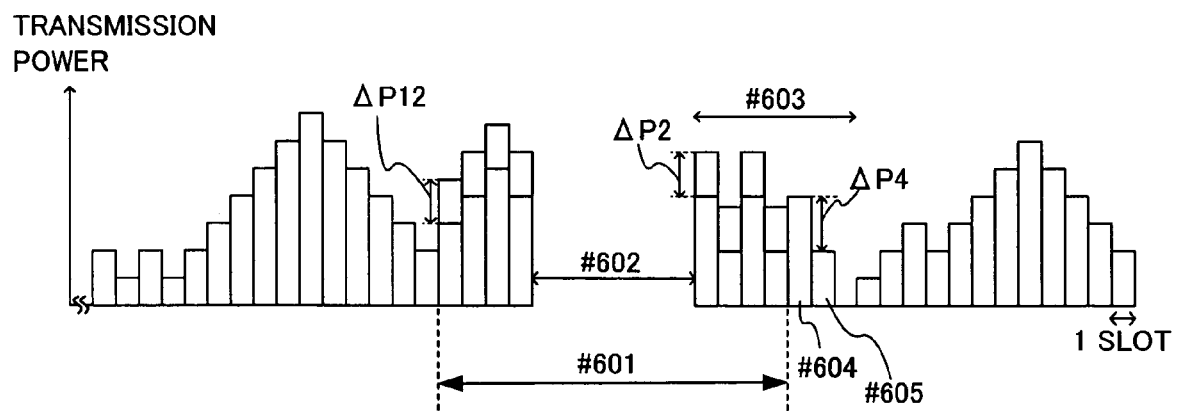
FIG. 9 illustrates transmission power of each slot according to Embodiment 1 of the present invention.

FIG. 9 illustrates a case where segment #603 called a recovery period is set after gap #602 in compressed mode frame #601, and segment #603 is provided to broaden a step of closed loop transmission power control. In segment #603, the transmission power of slot #605 is decreased by ΔP4 compared to the transmission power of slot #604. Even in the case of FIG. 9, DPCCH transmission power obtained by canceling ΔP2 of the transmission power indicated by the compressed mode information, is reported to base station 200 as the DPCCH transmission power information of frame #601.

As described above, according to Embodiment 1, additional transmission power due to the compressed mode—ΔPilot—is canceled, and transmission power set based on the TPC command without including a segment of transmission stop due to a gap of the compressed mode is reported as DPCCH transmission power information, so that by reporting transmission power according to communication environment, it is possible to perform appropriate system operation on the network side and prevent a decrease in throughput and a decrease in system efficiency.

In Embodiment 1, although the case has been described where FBI which is used for closed loop transmission diversity is not used, Embodiment 1 can be applied to a case where FBI is used.

Embodiment 2

Figure 10:
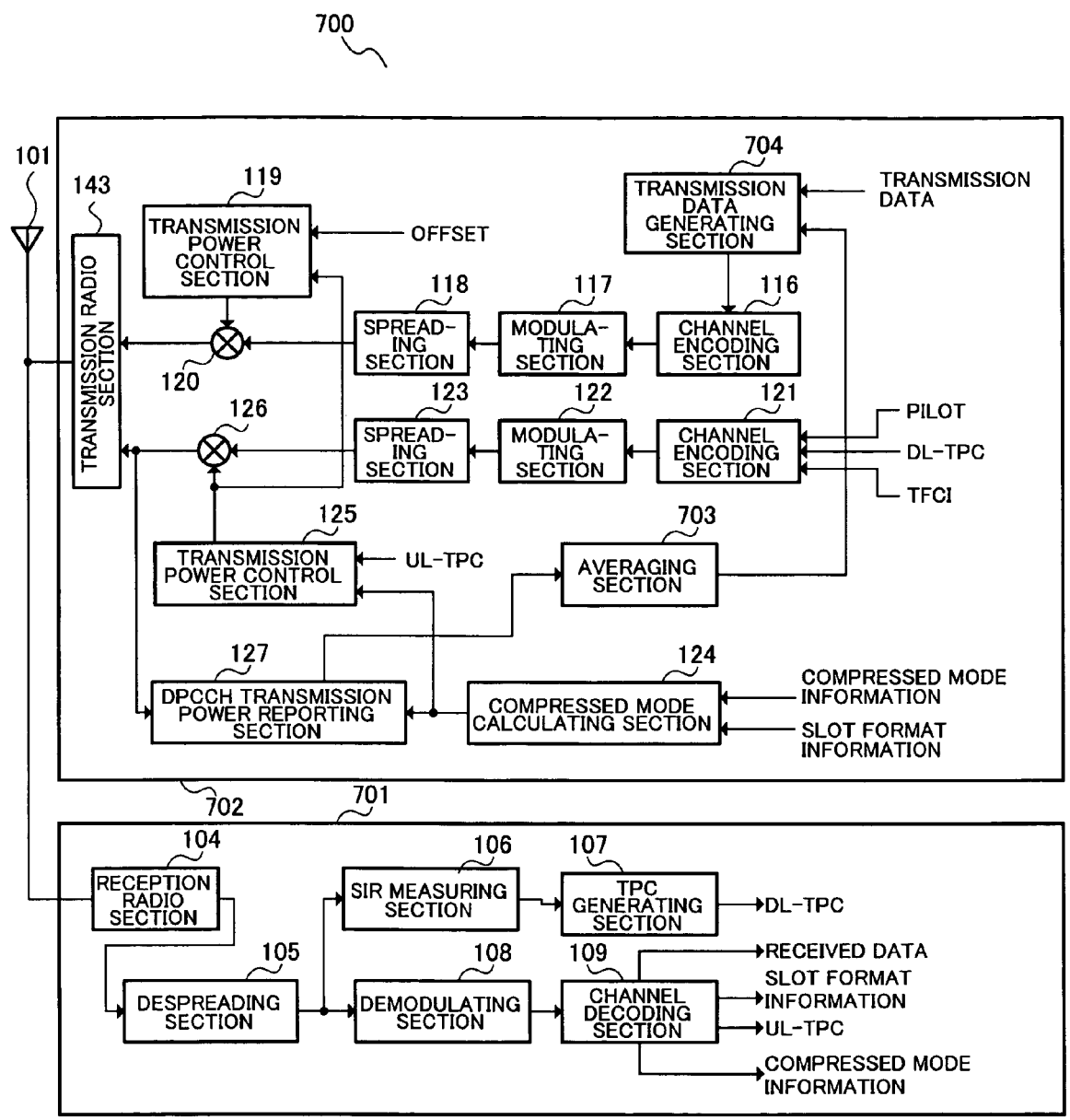
FIG. 10 is a block diagram showing a configuration of a communication terminal apparatus according to Embodiment 2 of the present invention.

FIG. 10 is a block diagram showing a configuration of communication terminal apparatus 700 according to Embodiment 2 of the present invention.

As shown in FIG. 10, communication terminal apparatus 700 according to Embodiment 2 is configured by removing despreading section 110, demodulating section 111, channel decoding section 112, despreading section 113, demodulating section 114, channel decoding section 115, channel encoding section 128, modulating section 129, spreading section 130, transmission power control section 131, multiplier 132, transmission power measuring section 133, buffer 134, data amount measuring section 135, transfer rate selecting section 136, transmission parameter setting section 137, channel encoding section 138, modulating section 139, spreading section 140, transmission power control section 141, and multiplier 142 from communication terminal apparatus 100 according to Embodiment 1 shown in FIG. 4 and adding averaging section 703 and transmission data generating section 704. In FIG. 10, parts that are the same as ones in FIG. 4 will be assigned the same reference numerals without further explanations.

Communication terminal apparatus 700 is mainly configured with antenna 101, reception apparatus 701, and transmission apparatus 702. First, the configuration of reception apparatus 701 will be described. Reception apparatus 701 is configured with reception radio section 104, despreading section 105, SIR measuring section 106, TPC generating section 107, demodulating section 108, and channel decoding section 709.

Channel decoding section 109 decodes received data inputted from demodulating section 108 and extracts a TPC command (UL-TPC) for controlling transmission power in uplink included in the received data. Also, channel decoding section 109 extracts compressed mode information including gap timing information and slot format information included in the received data. Then, channel decoding section 109 outputs the received data after extracting the TPC command, compressed mode information and slot format information.

Next, the configuration of transmission apparatus 702 will be described. Transmission apparatus 702 is configured with channel encoding section 116, modulating section 117, spreading section 118, transmission power control section 119, multiplier 120, channel encoding section 121, modulating section 122, spreading section 123, compressed mode calculating section 124, transmission power control section 125, multiplier 126, DPCCH transmission power reporting section 127, transmission radio section 143, averaging section 703 and transmission data generating section 704.

Channel encoding section 121, modulating section 122, spreading section 123, compressed mode calculating section 124, transmission power control section 125, multiplier 126, DPCCH transmission power reporting section 127 and averaging section 703 carry out processing for transmitting data on the DPCCH. Channel encoding section 116, modulating section 117, spreading section 118, transmission power control section 119, multiplier 120 and transmission data generating section 704 carry out processing for transmitting data on the DPDCH.

For frames other than a compressed mode frame, DPCCH transmission power reporting section 127 obtains a reported value of transmission power within a predetermined reporting segment based on transmission power inputted from multiplier 126, and outputs the reported value as transmission power information to averaging section 703. For compressed mode frames, DPCCH transmission power reporting section 127 subtracts ΔPilot from the transmission power inputted from multiplier 126 according to information of gap slots and ΔPilot information inputted from compressed mode calculating section 124, obtains a reported value of transmission power within a predetermined reporting segment based on the transmission power in which ΔPilot is subtracted, and outputs the reported value to averaging section 703.

Averaging section 703 averages transmission power of transmission power information inputted from DPCCH transmission power control section 127 for a predetermined period of time and outputs average transmission power information indicating averaged transmission power to transmission data generating section 704.

Transmission data generating section 704 includes the average transmission power information inputted from averaging section 703 in the inputted transmission data and outputs the transmission data to channel encoding section 116.

Channel encoding section 116 encodes the DPDCH transmission data inputted from transmission data generating section 704 and outputs the encoded transmission data to modulating section 117. The configuration of the base station is the same as that in FIG. 4, and therefore its description will be omitted.

As described above, according to Embodiment 2, in addition to the effects of Embodiment 1, by averaging DPCCH transmission power set based on the TPC command for a predetermined period of time and reporting information of the averaged transmission power, an influence of fluctuation for a short period of time, such as fading, can be eliminated, so that it is possible to perform stable control when it is hoped that a system is controlled for a relatively long period of time. Further, according to Embodiment 2, by averaging the DPCCH transmission power for a predetermined period of time and reporting the result, the frequency of reporting transmission power can be reduced, so that it is possible to perform more efficient system operation.

In Embodiment 2, transmission is performed at a normal transmission rate without performing uplink scheduling, however, this is by no means limiting, and this embodiment can be applied to a case where packet data is transmitted at a high rate by performing uplink scheduling.

Embodiment 3

Figure 11:
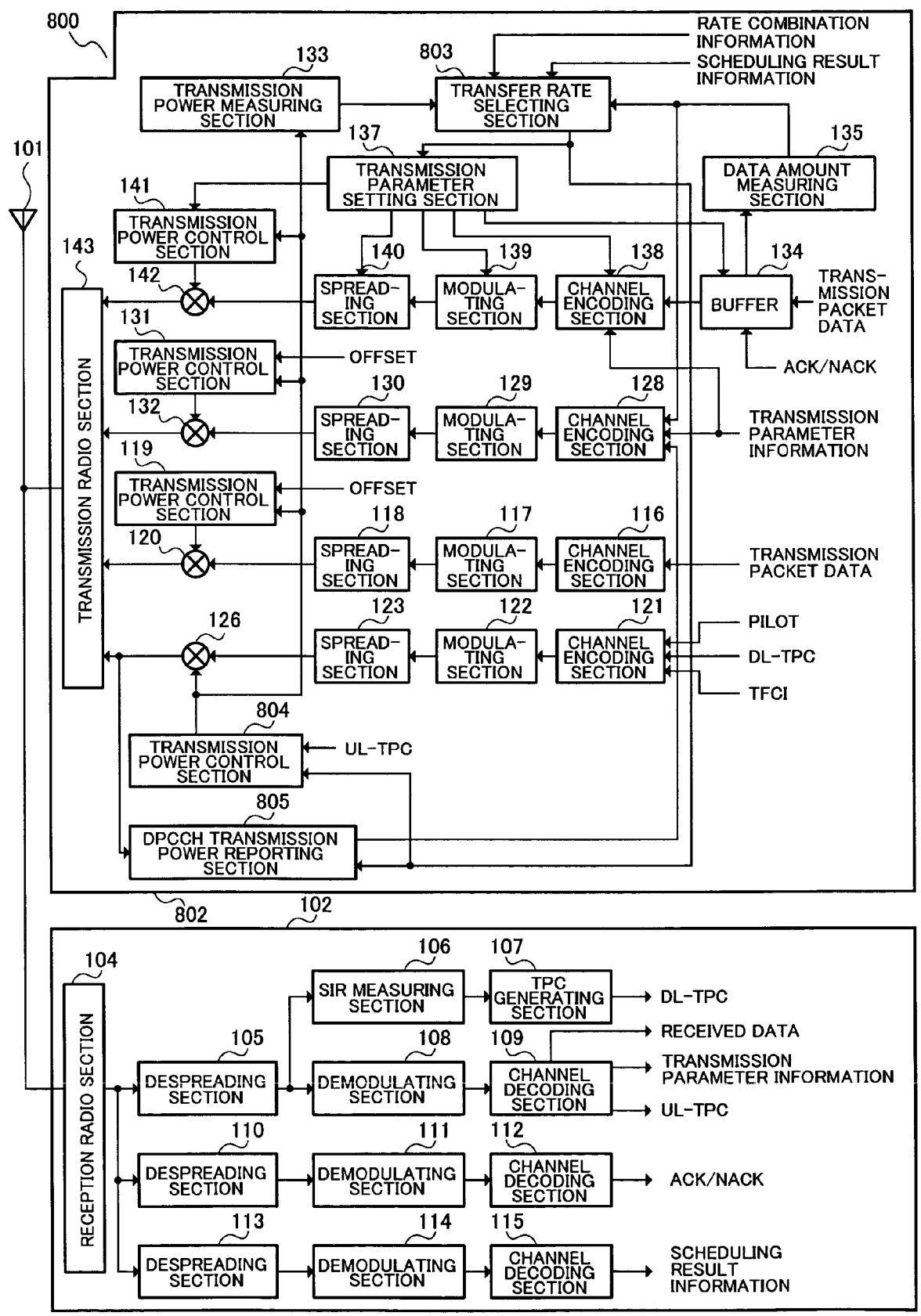
FIG. 11 is a block diagram showing a configuration of a communication terminal apparatus according to Embodiment 3 of the present invention.

FIG. 11 is a block diagram showing a configuration of communication terminal apparatus 800 according to Embodiment 3 of the present invention. As shown in FIG. 11, communication terminal apparatus 800 according to Embodiment 3 is configured by removing compressed mode calculating section 124 from communication terminal apparatus 100 according to Embodiment 1 shown in FIG. 4 and including transmission power control section 804 instead of transmission power control section 125, DPCCH transmission power reporting section 805 instead of DPCCH transmission power reporting section 127, and transfer rate selecting section 803 instead of transfer rate selecting section 136. In FIG. 11, parts that are the same as ones in FIG. 4 will be assigned the same reference numerals without further explanations.

Communication terminal apparatus 800 is mainly configured with antenna 101, reception apparatus 801 and transmission apparatus 802. First, the configuration of reception apparatus 801 will be described. Reception apparatus 801 is configured with reception radio section 104, despreading section 105, SIR measuring section 106, TPC generating section 107, demodulating section 108, channel decoding section 109, despreading section 110, demodulating section 111, channel decoding section 112, despreading section 113, demodulating section 114 and channel decoding section 115.

Channel decoding section 115 decodes received data inputted from demodulating section 114 and extracts scheduling result information that is information of a scheduling result.

Next, the configuration of transmission apparatus 802 will be described. Transmission apparatus 802 is configured with channel encoding section 116, modulating section 117, spreading section 118, transmission power control section 119, multiplier 120, channel encoding section 121, modulating section 122, spreading section 123, multiplier 126, channel encoding section 128, modulating section 129, spreading section 130, transmission power control section 131, multiplier 132, transmission power measuring section 133, buffer 134, data amount measuring section 135, transmission parameter setting section 137, channel encoding section 138 modulating section 139, spreading section 140, transmission power control section 141, multiplier 142, transmission radio section 143, transfer rate selecting section 803, transmission power control section 804 and DPCCH transmission power reporting section 805.

Channel encoding section 121, modulating section 122, spreading section 123, multiplier 126, transmission power control section 804 and DPCCH transmission power reporting section 805 carry out processing for transmitting data on the DPCCH. Channel encoding section 116, modulating section 117, spreading section 118, transmission power control section 119 and multiplier 120 carry out processing for transmitting data on the DPDCH. Channel encoding section 128, modulating section 129, spreading section 130, transmission power control section 131 and multiplier 132 carry out processing for transmitting data on a control channel for packet data in uplink. Transmission power measuring section 133, buffer 134, data amount measuring section 135, transmission parameter setting section 137, channel encoding section 138, modulating section 139, spreading section 140, transmission power control section 141, multiplier 142 and transfer rate selecting section 803 carry out processing for transmitting data on a channel for packet data in uplink.

Transmission power control section 119 multiplies transmission power inputted from transmission power control section 804 by a fixed offset and outputs the result to multiplier 120.

Multiplier 126 multiplies a transmission signal of the DPCCH inputted from spreading section 123 by transmission power set at transmission power control section 804, and outputs the result to DPCCH transmission power reporting section 805 and transmission radio section 143.

Channel encoding section 128 encodes transmission data including transmission power information inputted from DPCCH transmission power reporting section 805 and data amount information inputted from data amount measuring section 135 as information that is used by the base station for scheduling and outputs the encoded data to modulating section 129.

Transmission power control section 131 adds the offset amount inputted from transmission parameter setting section 137 to the transmission power inputted from transmission power control section 804 or subtracts the offset amount inputted from transmission parameter setting section 137 from the transmission power inputted from transmission power control section 804 and outputs the result to multiplier 132.

Transmission power measuring section 133 stores maximum transmission power as a resource, subtracts the transmission power inputted from transmission power control section 804 from the stored maximum transmission power and outputs information of the remaining resource, that is, information of the remaining transmission power to transfer rate selecting section 803.

Data amount measuring section 135 measures the data amount, according to the information of the data amount inputted from buffer 134 during a predetermined period of time, and outputs information of the measured data amount to channel encoding section 128 and transfer rate selecting section 803.

Transmission parameter setting section 137 selects transmission parameters such as the number of bits to be transmitted, coding rate, M-ary number, the offset amount of transmission power, and spreading factor based on the transmission rate information inputted from transfer rate selection section 803. Then, transmission parameter setting section 137 outputs indicative information that issues an instruction to output only the selected number of bits to buffer 134. Also, transmission parameter setting section 137 outputs indicative information that issues an instruction to perform encoding at the selected coding rate to channel encoding section 138. Transmission parameter setting section 137 also outputs indicative information that issues an instruction to perform modulation using the selected M-ary number to modulating section 139. Transmission parameter setting section 137 also outputs indicative information that issues an instruction to perform spreading at the selected spreading factor to spreading section 140. Further, transmission parameter setting section 137 outputs indicative information that issues an instruction to add the selected offset amount to the transmission power or subtract the selected offset amount from the transmission power to transmission power control section 119, transmission power control section 131 and transmission power control section 141.

Transmission power control section 141 adds the offset amount to the transmission power inputted from transmission power control section 804 or subtracts the offset amount from the transmission power inputted from transmission power control section 804, based on the indicative information inputted from transmission parameter setting section 137, and outputs the result to multiplier 142.

Transfer rate selecting section 803 selects an optimum transmission rate out of candidates for the transmission rate based on the transmission power information inputted from transmission power measuring section 133, scheduling result information extracted at channel decoding section 115, data amount information inputted from data amount measuring section 135 and rate combination information which is information of the candidates for the transmission rate. Then, transfer rate selecting section 136 outputs information of the selected transmission rate to transmission parameter setting section 137. If the scheduling result information includes information (information for transmission power setting) of a high-rate segment (Pilot Boost segment) where it is directed to perform transmission at a transmission rate (second transmission rate) higher than a predetermined transmission rate (first transmission rate), and ΔPilot information (information for transmission power setting) indicating an increment of transmission power, which is temporarily increased in order to improve channel estimation accuracy in the high-rate segment, transfer rate selecting section 803 outputs the high-rate segment information and the ΔPilot information to transmission power control section 804 and DPCCH transmission power reporting section 805.

Transmission power control section 804 which is a transmission power setting section sets transmission power (first transmission power) of the DPCCH, based on the instruction of the TPC command extracted at channel decoding section 109. At this time, according to the high-rate segment information inputted from transfer rate selecting section 803, transmission power control section 804 sets DPCCH transmission power (fist transmission power) based on the instruction of the TPC command for segments other than a high-rate segment and sets transmission power (second transmission power) that is higher by ΔPilot than the transmission power set based on the TPC command, according to ΔPilot information, for the high-rate segment. Then, transmission power control section 804 outputs the set transmission power to transmission power control section 119, multiplier 119, transmission power control section 131, transmission power measuring section 133 and transmission power control section 141.

According to the high-rate segment information and the ΔPilot information inputted from the transfer rate selecting section, for slots in segments other than the high-rate segment, DPCCH transmission power reporting section 805 that is a transmission power reporting section outputs the transmission power inputted from multiplier 126 as transmission power information to channel encoding section 128, and for slots (high-power slots) in the high-rate segment, subtracts ΔPilot from the transmission power inputted from multiplier 126, obtains a reported value of the transmission power within a predetermined reporting segment based on the transmission power in which ΔPilot is subtracted, that is, the TPC command, and outputs the result to channel encoding section 128 as transmission power information. The configuration of the base station is the same as shown in FIG. 5, and therefore its description will be omitted.

Figure 12:
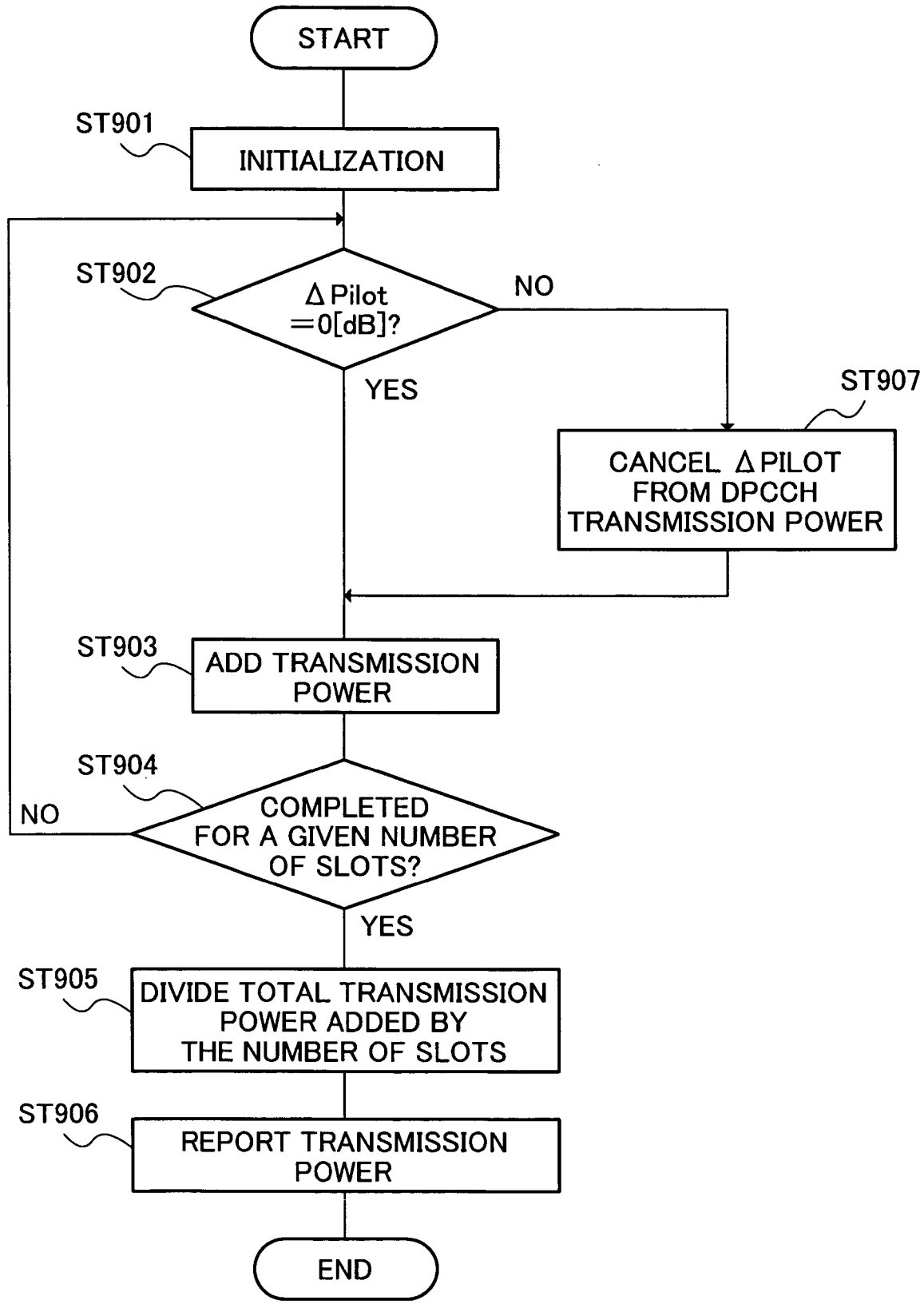
FIG. 12 is a flowchart illustrating a scheduling method according to Embodiment 3 of the present invention.

Next, a method for scheduling in uplink will be described using FIG. 12. FIG. 12 is a flowchart illustrating a scheduling method. First, a case will be described where communication terminal apparatus 100 receives a signal of a frame not including a high-rate segment.

Communication terminal apparatus 800 initializes DPCCH transmission power reporting section 805 (step ST901).

Then, channel decoding section 109 of communication terminal apparatus 800 acquires a received uplink TPC command.

Figure 13:
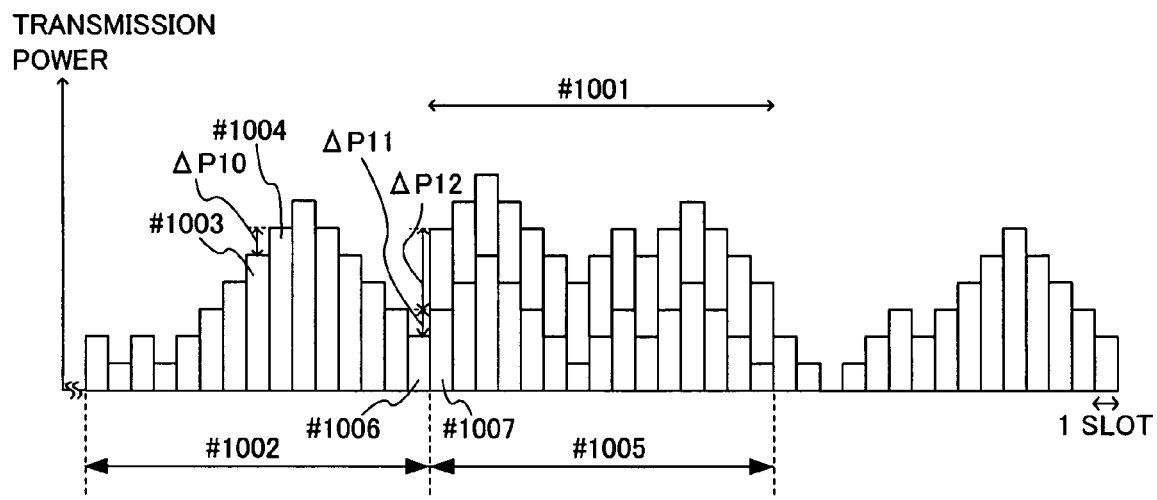
FIG. 13 illustrates transmission power of each slot according to Embodiment 3 of the present invention.

Then, transmission power control section 804 of communication terminal apparatus 800 sets DPCCH transmission power based on the TPC command. At this time, according to the information of high-rate segment inputted from transfer rate selecting section 803, a frame for processing does not include a high-rate segment, transmission power control section 804 outputs the transmission power set based on the TPC command to multiplier 126. In particular, as shown in FIG. 13, for frame #1002 not including high-rate segment #1001, transmission power control section 804 adds transmission power to the transmission power of the preceding received DPCCH slot in decibel (dB) units according to the instruction of the TPC command. For example, if the preceding received slot is slot #1003 and TPC command issues an instruction to increase the transmission power by $\Delta$P10, transmission power control section 804 sets the transmission power of slot #1004 to be transmitted next to slot #1003 by adding transmission power of $\Delta$P10 to the transmission power set for slot #1003.

Then, DPCCH transmission power reporting section 805 determines whether or not $\Delta$Pilot is 0 dB, that is, whether or not it is necessary to increase transmission power by $\Delta$Pilot in the high-rate segment (step ST902). At this time, frame #1002 does not include a high-rate segment, and therefore $\Delta$Pilot is 0 dB. Therefore, DPCCH transmission power reporting section 805 adds the transmission power set in accordance with the TPC command to the transmission power of past slots set after the initialization (step ST903).

Then, DPCCH transmission power reporting section 805 determines whether or not processing has been completed for all slots of frame #1002 (step ST904).

If processing has been completed for all slots of frame #1002, DPCCH transmission power reporting section 805 divides the additional value of the transmission power of the slots added after the initialization by the number of the slots and obtains transmission power per slot (step ST905). For example, frame #1002 is made up of 15 slots, and therefore transmission power per slot is determined by dividing the additional value of the transmission power set for the 15 slots by 15.

Then, communication terminal apparatus 800 reports the transmission power obtained by DPCCH transmission power reporting section 805 to base station 200 as DPCCH transmission power information (step ST906).

On the other hand, in step ST904, if processing has not been completed for all slots of frame #1002, processings of steps ST902 to ST904 are repeated.

When base station 200 receives the DPCCH transmission power information, transmission power information extracting section 206 extracts the transmission power information, and reception power measuring section 207 measures reception power. Then, scheduling section 208 of base station 200 carries out scheduling based on the reception power information and transmission power information. In particular, scheduling section 208 can estimate communication quality for each communication terminal apparatus by obtaining the DPCCH reception power at base station 200 of each communication terminal apparatus 800 with respect to the DPCCH transmission power at each communication terminal apparatus 800. Then, base station 200 transmits the scheduling result to each communication terminal apparatus 800 as scheduling result information. At this time, base station 200 includes information of setting frame #1005 next to frame #1002 to a high-rate segment and information indicating an increment of transmission power which is increased by $\Delta$P11 in the high-rate segment, in the scheduling result information. This is by no means limiting, and base station 200 may indicate a transmission rate, and communication terminal apparatus 100 may judge whether or not the transmission rate is high and determine $\Delta$P11 based on the result of the judgment.

Next, when communication terminal apparatus 800 receives the scheduling result information, channel decoding section 115 acquires the scheduling result information, and transfer rate selecting section 803 selects a transmission rate based on the scheduling result information. When selecting a transmission rate, for example, transfer rate selecting section 803 stores a table storing information for transmission rate selection, in which transmission power information, scheduling result information, data amount information, and rate combination information are associated with transmission rates, and selects a transmission rate by referring to the stored information for transmission rate selection using the transmission power information, scheduling result information, data amount information and rate combination information. Frame #1002 is not a frame including high-rate segment #1001, and therefore transfer rate selecting section 803 does not output the information of the high-rate segment and increment of the transmission power.

Based on the selected transmission rate, transmission parameter setting section 137 of communication terminal apparatus 800 selects transmission parameters such as the number of bits to be transmitted, coding rate, M-ary number, the offset amount of transmission power and spreading factor. When selecting the transmission parameters, for example, transmission parameter setting section 137 stores a table storing information for transmission parameter setting in which the transmission parameters is associated with transmission rates, and selects the transmission parameters by referring to the stored information for transmission parameter setting using information of the transmission rate selected at transfer rate selecting section 803.

Then, communication terminal apparatus 800 processes transmission packet data using the transmission parameter selected at transmission parameter setting section 137, and transmits the result to base station 200.

Next, the case will be described where communication terminal apparatus 800 receives a signal of a frame including the high-rate segment.

Communication terminal apparatus 800 initializes DPCCH transmission power reporting section 805, after setting of transmission power has been completed for all slots of frame #1002 (step ST901).

Then, channel decoding section 109 of communication terminal apparatus 800 acquires a received uplink TPC command.

In communication terminal apparatus 800, when a timing is changed from the transmission timing of frame #1002 to the transmission timing of frame #1005, the high-rate segment information and $\Delta$Pilot information are outputted from transfer rate selecting section 803 to transmission power control section 804 and DPCCH transmission power reporting section 805.

Then, transmission power control section 804 of communication terminal apparatus 800 sets DPCCH transmission power based on the TPC command and $\Delta$Pilot information. In particular, transmission power control section 804 adds transmission power to the transmission power of the preceding received DPCCH slot in decibel (dB) units according to the instruction of the TPC command and adds ΔPilot to the transmission power set in accordance with the TPC command according to the ΔPilot information. For example, if the preceding received slot is slot #1006 and the TPC command issues an instruction to increase the transmission power by ΔP11, transmission power control section 804 sets the transmission power added by transmission power of ΔP11 to the transmission power set for slot #1006 as the transmission power of slot #1007 to be transmitted next to slot #1006. Further, transmission power control section 804 adds ΔP12 to the transmission power as ΔPilot according to the ΔPilot information. That is, transmission power control section 804 sets the transmission power of slot #1007 increased by (ΔP11+ΔP12) from the transmission power of slot #1006.

Then, DPCCH transmission power reporting section 805 of communication terminal apparatus 800 determines whether or not ΔPilot is 0 dB (step ST902).

Frame #1005 is a frame including high-rate segment #1001, and therefore ΔPilot is not 0 dB. Therefore, DPCCH transmission power reporting section 805 cancels ΔPilot—ΔP12—from the DPCCH transmission power set at transmission power control section 804 (step ST907). Then, DPCCH transmission power reporting section 805 adds the transmission power obtained after canceling ΔP12 from the DPCCH transmission power set at transmission power control section 804—the transmission power set in accordance with the TPC command—to the transmission power of past slots set after the initialization (step ST903). The additional value of the obtained transmission power of the slots in frame #1005 is the addition of only the transmission power not including ΔP12, so that it is possible to measure DPCCH transmission power that does not include transmission power control other than closed loop transmission power control. Subsequent processing is the same as processing for a frame not including the high-rate segment, and therefore its description will be omitted.

Figure 14:
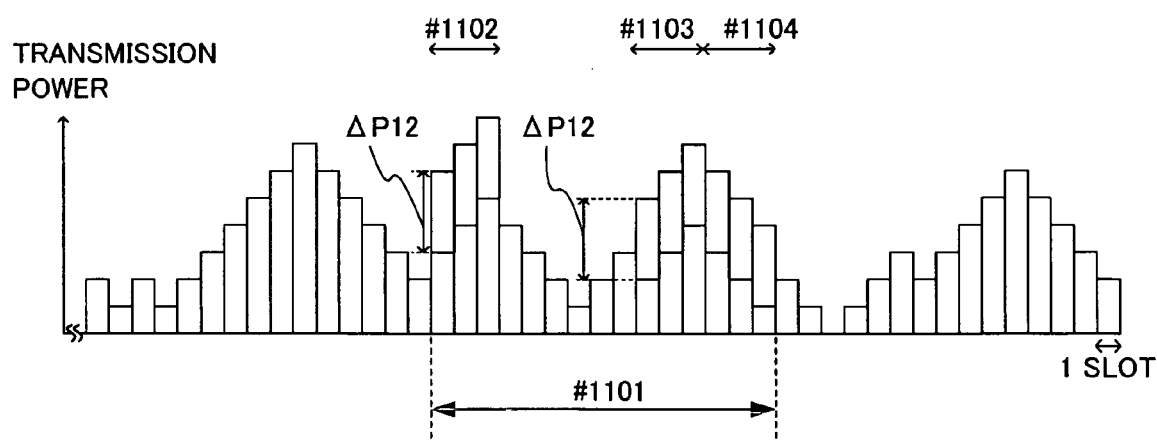
FIG. 14 illustrates transmission power of each slot according to Embodiment 3 of the present invention.

Although the high-rate segment as shown in FIG. 13 has a length of one frame, this is by no means limiting, and its length may be other than one frame. FIG. 14 shows a case where a high-rate segment is one-fifth length of one frame. Frame #1101 includes three high-rate segments: high-rate segment #1102, high-rate segment #1103 and high-rate segment #1104. In high-rate segments #1102, #1103 and #1104, transmission power is increased by ΔPilot—ΔP12—from the transmission power set in accordance with the TPC command. Therefore, when obtaining the additional value of the transmission power of all slots in frame #1101, DPCCH transmission power reporting section 805 cancels ΔP12 and obtains transmission power set in accordance with the TPC command in the high-rate segments #1102, #1103 and #1104 and obtains the additional value of the transmission power of all slots in which ΔP12 is canceled.

As described above, in Embodiment 3, in a frame including a high-rate segment, ΔPilot is canceled from the transmission power set in accordance with the TPC command, and transmission power set based on the TPC command is reported, so that by reporting transmission power according to communication environment, it is possible to perform appropriate system operation on the network side and prevent a decrease in throughput and a decrease in system efficiency.

Although, in Embodiment 3, the transmission power of a pilot symbol included in DPCCH is increased in a high-rate segment, this is by no means limiting, and in order to improve channel estimation accuracy, it is possible to use a method of transmitting a pilot symbol (secondary pilot) on another channel other than the pilot included in the DPCCH and the DPCCH. In this case, it is only necessary to report DPCCH transmission power measured without including the pilot symbol on another channel other than the DPCCH in the DPCCH transmission power measurement. In Embodiment 3, such a method can be also considered that increases the number of pilot symbols included in the DPCCH to improve channel estimation accuracy, however, this has no particular effect when DPCCH transmission power is measured. In this case, it is possible to use a method of measuring the transmission power of a pilot symbol instead of transmission power of the DPCCH, however, there is no particular effect unless the transmission power of additional pilot symbols is included in the transmission power measurement.

Although, in Embodiments 1 to 3, ΔPilot is canceled after transmission power is set, this is by no means limiting, transmission power may be calculated and reported to the base station before adding ΔPilot. Although, in Embodiments 1 to 3, an example has been described where the reporting segment is one frame, and therefore, transmission power is reported to the base station after processing is completed for all slots of one frame, this is by no means limiting, and the reporting segment may be an arbitrary segment other than one frame, and transmission power may be reported to the base station after processing for an arbitrary segment other than one frame is completed.

Although, in Embodiments 1 to 3, transmission power of the DPCCH is reported, this is by no means limiting, and transmission power of an arbitrary channel other than DPCCH may be reported, if closed loop transmission power control can be applied to the channel and a pilot symbol is included in the channel. Although, in Embodiments 1 to 3, transmission power of the DPCCH is measured, this is by no means limiting, and transmission power may be measured or calculated and reported using only a pilot symbol included in the DPCCH. Although, in Embodiments 1 to 3, all ΔPilot within the compressed mode frame is the same, this is by no means limiting, and ΔPilot of each slot within the compressed mode frame may vary for each slot. Although, in Embodiments 1 to 3, transmission power of a channel including a pilot signal is reported, this is by no means limiting, and it is possible to report transmission power of a channel including an arbitrary known signal other than the pilot signal.

Although, in Embodiments 1 to 3, the example has been described where information of transmission power and transmission data amount of the communication terminal apparatus is transmitted in a reporting cycle indicated by transmission parameter information or after repetition processing is performed, targets subjected to transmission control by transmission parameter information are not limited to this, and CQI (Channel Quality Indicator) which is information used for reporting a quality of downlink propagation path in high-rate downlink packet transmission, or ACK and NACK in HARQ is possible. Any signal is possible providing a signal transmitted in uplink.

In Embodiments 1 to 3, transmission power in which the ΔPilot effect is removed from the transmission power set at transmission power control section 125 is reported as a reported value, or an average value of transmission power in which the ΔPilot effect is removed from the transmission power set at transmission power control section 804 is reported as a reported value. However, this is by no means limiting, and any reported value is possible if the reported value is based on transmission power in which the ΔPilot effect is not included or removed from the transmission power set at the transmission power control section. In short, the communication terminal apparatus performs reporting in order to know transmission power not including effects of an increase of the transmission power of a pilot symbol included in the DPCCH due to the compressed mode and high-rate transmission at the communication terminal apparatus, and therefore, any reported value is possible if this purpose can be achieved. For example, the reported value may be a ratio of transmission power in which the ΔPilot effect is excluded from the transmission power set at the transmission power control section, to a reference power, that is, a relative value. In this case, as the reference power, for example, it is possible to use maximum transmission power of the communication terminal apparatus or maximum transmission power allowed for the communication terminal apparatus, and a shared reference power may be stored in both the base station apparatus and the communication terminal apparatus.

The present application is based on Japanese Patent Application No. 2004-181792, filed on Jun. 18, 2004, entire content of which is expressly incorporated by reference herein.

INDUSTRIAL APPLICABILITY

The communication terminal apparatus, scheduling method, and the transmission power deriving method according to the present invention is capable of performing appropriate system operation on a network side by reporting transmission power according to communication environment, provide an advantage of preventing a decrease in throughput and system efficiency, and are useful for scheduling.

The invention claimed is:

1. A communication terminal apparatus comprising:
a transmission power setting section that sets transmission power for a predetermined channel based on a TPC command and transmission power setting information which comprises information for setting transmission power for predetermined slots before and after a slot in which transmission is temporarily stopped, the TPC command and the transmission power setting information being included in a received signal;
a transmission power reporting section that reports a reported value of transmission power which is set in the transmission power setting section, based on the transmission power for a predetermined time span not including the slot in which transmission is temporarily stopped; and
a transmitting section that transmits a transmission signal based on the transmission power set in the transmission power setting section.

2. The communication terminal apparatus according to claim 1, wherein the transmission power reporting section reports the reported value indicating a ratio of the transmission power which is set in the transmission power setting section, to maximum transmission power of the communication terminal apparatus or maximum transmission power allowed for the communication terminal apparatus.

3. The communication terminal apparatus according to claim 2, wherein the transmission power reporting section reports the reported value based on an average value of the transmission power set in the transmission power setting section in the predetermined time span.

4. The communication terminal apparatus according to claim 1, wherein the transmission power reporting section reports the reported value based on an average value of the transmission power set in the transmission power setting section in the predetermined time span.

5. A transmission power reporting method comprising:
at a communication terminal apparatus, setting transmission power for a predetermined channel based on a TPC command and transmission power setting information which comprises information for setting transmission power for predetermined slots before and after a slot in which transmission is temporarily stopped, the TPC command and the transmission power setting information being included in a received signal; and
at the communication terminal apparatus, from set transmission power, reporting a reported value of transmission power based on the transmission power for a predetermined time span not including the slot in which transmission is temporarily stopped.

6. The transmission power reporting method according to claim 5, wherein the communication terminal apparatus reports the reported value indicating a ratio of the set transmission power to maximum transmission power of the communication terminal apparatus or maximum transmission power allowed for the communication terminal apparatus.

7. The transmission power reporting method according to claim 6, wherein the communication terminal apparatus reports the reported value based on an average value of the transmission power set in the predetermined time span.

8. The transmission power reporting method according to claim 5, wherein the communication terminal apparatus reports the reported value based on an average value of the transmission power set in the predetermined time span.

* * * * *